United States Patent
Heckmann

(10) Patent No.: US 9,978,273 B2
(45) Date of Patent: May 22, 2018

(54) METHOD AND SYSTEM FOR IMPROVING A TRAFFIC PARTICIPANT'S ATTENTION

(71) Applicant: HONDA RESEARCH INSTITUTE EUROPE GMBH, Offenbach/Main (DE)

(72) Inventor: Martin Heckmann, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days. days.

(21) Appl. No.: 15/334,514

(22) Filed: Oct. 26, 2016

(65) Prior Publication Data
US 2017/0148318 A1    May 25, 2017

(30) Foreign Application Priority Data

| Nov. 19, 2015 | (EP) | 15195446 |
| Dec. 10, 2015 | (EP) | 15199247 |
| Mar. 3, 2016 | (EP) | 16158394 |

(51) Int. Cl.
| G08G 1/0962 | (2006.01) |
| G08G 1/16 | (2006.01) |
| B60W 50/14 | (2012.01) |

(52) U.S. Cl.
CPC ............ *G08G 1/0962* (2013.01); *G08G 1/16* (2013.01); *B60W 50/14* (2013.01); *B60W 2540/02* (2013.01); *B60W 2540/22* (2013.01)

(58) Field of Classification Search
CPC .... G08G 1/0962; G08G 1/16; G06K 9/00845; B60W 50/14; B60W 50/16
See application file for complete search history.

(56) References Cited

U.S. PATENT DOCUMENTS

| 7,642,922 | B2 | 1/2010 | Itou | |
| 8,384,534 | B2 * | 2/2013 | James | B60Q 9/008 340/435 |
| 9,505,413 | B2 * | 11/2016 | Laine | B60W 50/14 |

(Continued)

FOREIGN PATENT DOCUMENTS

| EP | 2 168 815 A1 | 3/2010 |
| EP | 2 528 049 A1 | 11/2012 |
| WO | 2015/165811 A1 | 11/2015 |

OTHER PUBLICATIONS

European Search Report application No. 16158394.3 dated Mar. 22, 2017.

*Primary Examiner* — Todd Melton
(74) *Attorney, Agent, or Firm* — Squire Patton Boggs (US) LLP

(57) ABSTRACT

A method and a system for improving a traffic participant's attention is such that, at first, information on the traffic scene that is encountered by the traffic participant is obtained. From the obtained information a traffic situation development is predicted. A measure for at least on future risk in the predicted traffic situation development is determined and a communication with the traffic participant is started. The communication comprises a first step of notifying the traffic participant and a second step of providing additional information in response to the traffic participants reaction to the notification which includes some information on the determined future risk.

16 Claims, 2 Drawing Sheets

(56) References Cited

U.S. PATENT DOCUMENTS

2010/0253541 A1 10/2010 Seder et al.
2011/0169625 A1 7/2011 James et al.
2014/0191883 A1 7/2014 Bolton et al.
2014/0210978 A1 7/2014 Gunaratne et al.
2016/0236690 A1* 8/2016 Juneja ..................... G06F 3/16

* cited by examiner

METHOD AND SYSTEM FOR IMPROVING A TRAFFIC PARTICIPANT'S ATTENTION

BACKGROUND

Field

The invention relates to a method and a corresponding system for improving a traffic participant's attention, in particular the attention of a driver of a vehicle.

Over the last years traffic situations became more and more complex, in particular due to an increasing density of traffic. Thus, it becomes more and more difficult for traffic participants to recognize any aspect of a traffic situation. Thus, there is an increasing risk that the traffic participant, in particular a driver of a vehicle, is not aware of any risk that might develop in the future. In order to assist him, there have been developed quite a number of assisting systems. One example is a blind spot detection system that increases the awareness of a driver of a vehicle in the blind spot. Another example is a forward collision warning system. Such a system informs the driver if he is approaching a leading vehicle or obstacle to quickly. These systems usually observe the environment of a vehicle and output a warning to the driver to inform the driver of imminent threats with a high likelihood. The problem of these systems is that they do not take into consideration that a driver may already be aware of the risk. Thus, even in a situation where the driver already recognized the traffic situation correctly, a warning will be output and thus the driver might be annoyed or even disturbed.

Despite such systems that only output a warning like a beeping sound or a warning lamp, systems are known that communicate with a driver in order to present him information on an upcoming traffic situation. The system described in U.S. Pat. No. 7,642,922 B2 determines an unsafe driving situation and gives suggestions to the driver on how to improve his driving. At first the system detects that the driver performs unsafe driving like for example driving above a speed limit or driving with too short a gap to the leading vehicle and if such unsafe driving is detected, a communication with the driver is initiated. The initiated communication is used in order to determine the situation awareness of the driver. This means that a question regarding the traffic situation that was detected as being unsafe is asked to the driver and from a response of the driver, it is inferred if the driver is aware of the traffic situation and his driving. This approach has a plurality of disadvantages. Firstly, the system needs time before the awareness of the driver can be determined, because there is some time needed in order to ask the driver a question, wait for the response and then process the response for inferring the driver's state. On the other side it is necessary to start the communication with the driver in order to infer the driver's state at all. Thus, even in case that the driver is fully aware of the situation he is in, he will be disturbed by the question that is asked.

In US 2014/0191883A1 a system is proposed that analyses the traffic environment of a vehicle as well as the attention of the driver. The system evaluates if the driver pays attention to an aspect of the entire traffic environment that might lead to a risk or a threat. If it is detected that the awareness of the driver is directed only to other aspects of the scene, the system guides the attention of the driver in a non-obtrusive way in the direction of the threat. The system uses a ring of lights in order to guide the attention of the driver. This system is of limited functionality and it also takes quite a while until the driver will be aware of aspects of the scene that are relevant for correctly assessing the traffic situation. This is because at first the driver has to be aware of the lighting system that guides his attention to a relevant aspect, to follow this, and after that to reconsider his situation assessment.

As only a lights ring for guiding the drivers attention is used for notifying the driver to redirect his focus to another area of the traffic scene, no adaptation of obtrusiveness to different traffic situations or differently urgent situations can be achieved. At least the driver will not be annoyed, which otherwise might lead to switching off the system entirely.

SUMMARY

It is a target of the present invention to provide a system and a method that efficiently assist a driver or another traffic participant by improving his attention to relevant aspects of the traffic scene in a non-obtrusive manner in order to also improve acceptance of such a system but at the same time ensuring that all information can be considered by the driver quickly.

This is achieved by the method and the system according to the independent claims of the present invention.

According to the present invention at first information on a traffic scene that is encountered by the traffic participant is obtained. On the basis of the obtained information a traffic situation development is predicted. From the prediction of such traffic situation development a measure for at least one future risk in the predicted traffic situation development is determined. A communication with the traffic participant is started, wherein the communication comprises two steps. In the first step, the traffic participant is notified by providing some information on the determined future risk and in the second step additional information is provided in response to the traffic participants reaction to the notification. Splitting information that is provided to be given in two steps allows to give a first short communication in a non-obtrusive way in case the situation allows. Then, after a response from the traffic participant was received additional information is provided only in a second step. Because the reaction of the traffic participant to the notification is taken into consideration when the additional information is provided in the second step the system provides efficiently information that is needed or desired by the traffic participant in order to be aware of anything he needs to know about the traffic situation for save driving, walking or the like.

The system comprises a prediction means for predicting the traffic situation, a future risk determining means for determining a measure for at least one future risk in the predicted traffic situation development and communication control means for controlling a notification of the traffic participant and for providing additional information in response to the traffic participants reaction. By means of the communication control means it is not only possible to adapt the content additional information to what is needed by the traffic participant but it is also possible to control the notification already in such a way that the least obtrusive way of providing sufficient information in the notification is chosen. Thus, if a risk that is detected lies in the far future, there is plenty of time and thus only few information might be given. Then it can be awaited what additional information is requested by the traffic participant. On the other side if the detected risk is very urgent and severe there might be given even a lot more information in the initial notification already in order to achieve a quick reaction of the traffic participant. Of course, the communication control means might adapt the content and the way of notifying the traffic participant also to other aspects and characteristics of the detected risk. Examples will be given later on.

The sub claims define advantageous aspects of the present invention.

It is particularly advantageous that the traffic participant's risk awareness is determined and the communication is started only in case that a predetermined condition is fulfilled. This predetermined condition is set for a combination of the risk awareness and the detected future risk. Thus, by the communication control means it can be decided also if communication is started at all. By doing so it can be avoided that in situations where it is determined that the traffic participant is fully aware of the risk it can be avoided to output any notification at all. The driver consequently will not be annoyed by a system notifying him of aspects of a traffic scene which he is already aware of. Consequently, the acceptance of such system will be improved and switching of the system can be avoided. The predetermined condition takes into consideration a combination of the risk awareness and future risk measure. Thus, risks of lower urgency and/or severity combined with a high risk awareness might lead to no notification being output but for safety reasons in case of very urgent risks coming up and a same level of risk awareness a notification might nevertheless be output.

In order to determine the traffic participant's risk awareness, there are provided sensors that sense the traffic participant. In combination with a traffic participant model, this allows estimating a traffic participant's state from which the risk awareness is calculated. For example, a gaze angle may be inferred from images taken from a camera that is directed to the traffic participant in order to determine which areas of a traffic scene are currently noticed by the traffic participant. Thus, it can be inferred if the traffic participant at a particular point in time is aware of a situation development that is responsible for an upcoming risk.

According to another advantageous aspect, there may be a plurality of future risks in the predicted traffic situation development being determined individually and for each determined risk a dedicated traffic participant's risk awareness is determined. In particular, in case that the focus of the attention of the traffic participant is inferred as described above, it can be determined of which risks the driver or traffic participant is already aware and which one he might have overseen. Thus, the notification as indicated above can be output in respect of those risks only where it has been estimated that the driver's attention was not sufficient.

Additionally, the future risks that are determined can be ranked with respect to a priority value that is associated with the future risks. Such priority value is advantageously based on temporal occurrence of its associated future risk. Thus, in case that the future risks that are detected will most probably occur in timely sequence, this time sequence can be reflected by the priority values that is associated to the individual risks. Based on such priority value, it is then possible to improve the traffic participant's attention at first with respect to the next upcoming risk and only after that the system will go ahead and address the next risk in timely sequence.

Alternatively or in addition, it is only possible to base the priority value on a severity or of its associated future risk. Thus, even if one particular detected risk is not the next one coming up, but may cause more severe danger to another traffic participant for example, it might be given a higher priority than the next risk to come, which has only minor impact. In that case, the ranking of the future risks might be such that the future risk lying further ahead in the future but having a greater impact is handled first.

If priorities have been assigned to the individual future risks that are detected, it is particularly advantageous to start a communication with respect to a future risk only if there is no other future risk with a higher priority value.

According to another preferred aspect, the timing of a beginning of a communication is set in accordance with the characteristic of the determined future risk. By doing so, it is possible to start a communication with the traffic participant not only immediately at the moment where it was determined that such communication is necessary, but the communication may also be delayed for example if it can be recognized that the driver is involved in another aspect of the current traffic situation that needs his full attention.

Different modalities of the communication are available and it is in particular advantageous to use a combination of at least two different modalities such as acoustic, visual, haptic and speech input and/or output.

Another advantageous aspect is that the communication information of the notification and/or the additional information comprises information on at least one of location, trajectory, identity, urgency, likelihood and level of the future risk.

Furthermore, it is advantageous that a violation of a traffic law is also determined as a future risk. Such violation of a traffic law can be for example driving above speed limit or not yielding priority at an uncontrolled intersection.

BRIEF DESCRIPTION OF THE DRAWINGS

Further aspects and advantages of the present invention will be explained with respect to the annexed drawings in which.

DETAILED DESCRIPTION

The invention will now be described with respect to the system being mounted in a vehicle such as a car. In order to alleviate distinguishing between the traffic participant who is supported by the inventive system and method, the traffic participant will be denoted as driver or ego-vehicle driver contrary to the other traffic participants. These other traffic participants may be pedestrians, cyclists, motorcyclists, other cars or the like.

Figure 1:
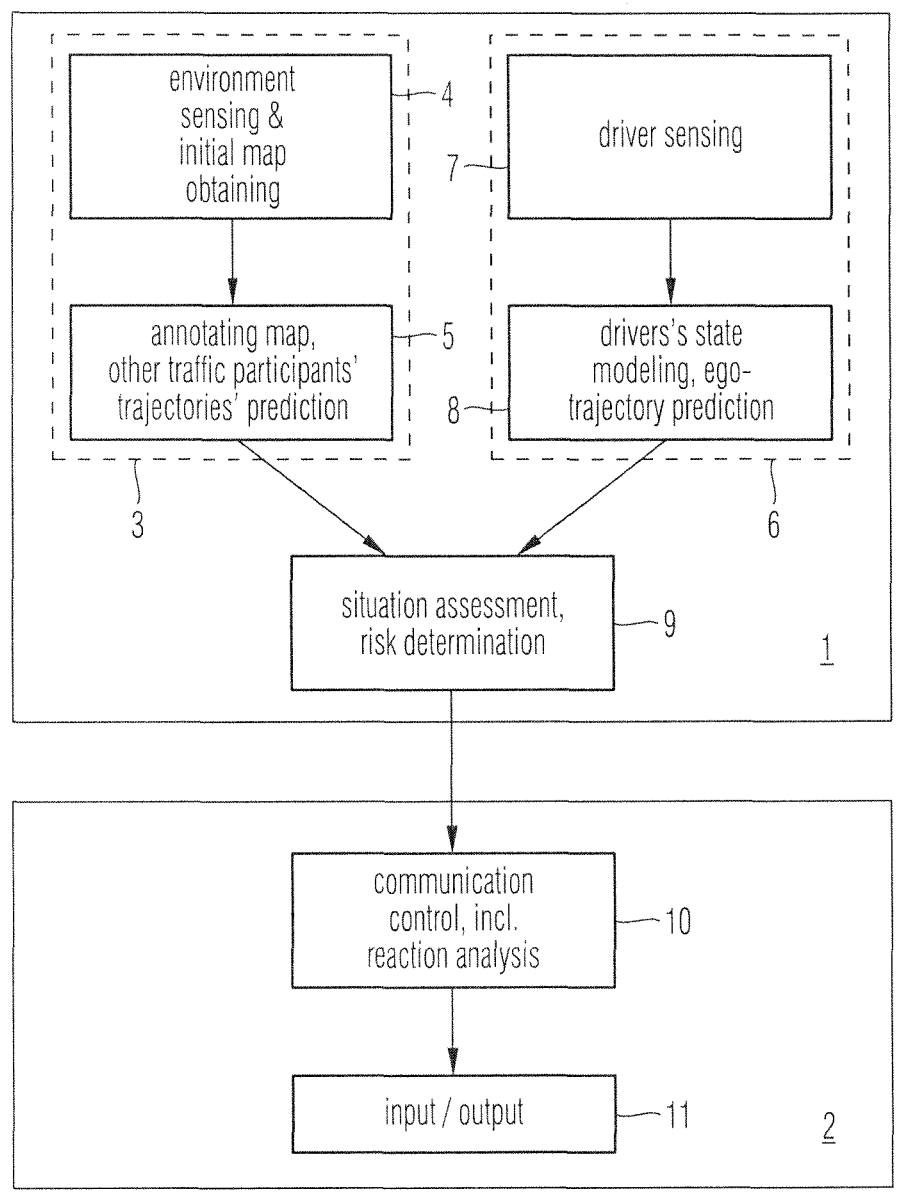
FIG. 1 shows a block diagram of the system according to the invention.

The system as shown in FIG. 1 can be divided into two blocks. The first block 1 comprises all means for sensing and interpretation of a current traffic scene. Based on the output of the first block 1, a second block 2 responsible for planning and execution of the interaction (communication) carries out the two-step communication with the driver.

The first block 1 comprises a prediction block 3 for predicting a traffic situation development that might be encountered by the vehicle in the future. This prediction block 3 includes means 4 for traffic environment sensing and obtaining an initial map, for example from a navigation system. The sensors used may comprise a camera, radar sensor, lidar sensor or a laser scanner or a plurality or combination of them. On the basis of the sensors' output it will then an environment representation be built that includes information on traffic infrastructure elements and/or other traffic participants.

This information is then transferred to a prediction unit 5. In this prediction unit 5, the information received from the means 4 for environment sensing and initial map obtaining is evaluated and a future development of traffic situations is calculated. In order to achieve this in a first step, an annotated map is generated starting from the initial map by adding the information from environment sensing. This annotated map thus builds an environment representation including information on the traffic infrastructure elements and/or other traffic participants and their trajectories. On the basis of this annotated map, then prediction of future trajectories of the other traffic participants is possible. Evaluation of these trajectories together with further information such as traffic rules (for example speed limits, priority rules at intersections), if available, result in an estimation of a future traffic situation development. Thus, the evaluation at first predicts the development of a traffic situation and then determines from this predicted traffic situation development a measure for at least one future risk. Of course, there might be a plurality of future risks that can be predicted for each of which a measure might be determined. For example, if a car approaches an intersection, there might be a first future risk be recognized, because the car approaches the intersection to fast to yield priority to a car that is also approaching the same intersection from the right. Additionally another car, which is already slowing down ahead of the ego-vehicle might approach this intersection, and thus the ego-vehicle closes the gap too quickly. Thus, two distinct risks may be determined. For each of these risks an individual measure is determined.

On the other side, the system comprises a driver's state modeling block 6. This driver's state modeling block 6 includes one or a plurality of sensors directed to the driver of the ego-vehicle. In the driver's state modeling block 6 in particular the attention of the driver to the traffic scene or parts thereof is determined. A plurality of methods is known per se that can be used in order to determine the driver's attention. These known methods can be used or combined. When a camera is used as the driver sensing means 7 evaluation of an eye-blink rate, pupil dilatation or interaction patterns with vehicle controls as steering wheel or paddles can be evaluated in order to determine a basic level of drowsiness.

From this perception of the driver and his actions it is inferred what the driver has seen in a traffic scene. In a driver state modelling unit 8 this information is used to feed a model of the driver which is based on psychological models of information processing in human attention. Additional information can be provided by a driver's smartphone for example. In the driver state modelling unit 8 it is possible to infer what the driver has perceived in the traffic scene. From this perception it is then derived at a driver's risk awareness for the individual risks. In the driver's state modelling block 6 it is also estimated what the driving intention of the driver is. From the current driving status and his intention the future trajectory of the ego vehicle can be estimated.

The result of prediction unit 5 and driver state modelling unit 8 are then supplied to a situation assessment unit 9. In the assessment unit 9 the information regarding the other traffic participants which is received from prediction unit 5 and information on the driver which is received from driver state modelling unit 8 is combined. The driver state modelling unit 8 may furthermore generate the prediction of the drivers intended behaviour, since by sensing the actions of the driver it is possible to conclude if the driver is for example planning a turning manoeuvre or the like. To predict the intended driver behaviour also a route that it known to the system for example from a navigation system where a destination is entered by the driver can be used. This improves the prediction of the future trajectory of the ego vehicle. Additionally data that has been collected from previous drives in the same area can be used which is in particular helpful if the driver for example is on his usual commute route which the system has learned over time.

The results from the prediction unit 5 and the driver state modelling unit 8 are then combined in the situation assessment unit 9. Here with the integration of the two types of information future threats or future risks can be predicted. In particular the impact, time and likeliness can be determined but also the extent to which the driver is aware of each individual risk or behaviour of another traffic participant leading to this risk can be determined. In the situation assessment unit 9 a priority will be associated with each individual risk. This priority can for example be high in case that there is a very urgent risk and lower if the risk lies further in the future. Furthermore it can be taken into consideration by increasing the priority if it is recognized that the driver awareness for this particular future risk is very low. The priority can be reduced if it is determined that the risk awareness for this particular risk is already high.

The situation assessment unit 9 provides its combined information to the communication control means 10. In the communication control means it is then decided if a communication with the driver is started or not. The communication is started only if a predetermined condition is fulfilled by a combination of the risk awareness and future risk measure. This means that if no future risk measure is determined there will be no communication started with the driver except for example indicating to the driver that the system is working properly. If on the other side it is recognized that there will be encountered a risk in the future and the risk awareness for this particular future threat is not sufficient a communication will be started by the communication control means 10. The communication is then performed by using input/output means 11 that is capable of using different modalities for communication with the driver. For example the output can be visual, haptic, acoustic or speech. Thus, it is possible to use the modality according to different characteristics of the threat, for example its location, its trajectory, its identity, its urgency, its possible impact or its likelihood.

The communication itself will be controlled to be a two-step communication. In the first step, the communication control means 10 outputs a notification to the driver. This notification is adapted to the characteristics of the determined future risk and takes also into consideration the risk awareness for this particular threat of the user. If, for example, in the driver state modeling unit 8 it is determined that the driver is not at all aware of an upcoming dangerous traffic situation, an urgent, rather obtrusive warning might be output. Such an urgent warning could be for example an acoustic warning signal in combination with speech output that already gives the driver information on the upcoming threat or risk. In case that a mid level risk awareness of the driver is recognized, a mild warning can be output and in case that it is judged that the driver is already aware of the risk, nevertheless an unobtrusive information on the upcoming risk might be given. The choice of modality may thus take into consideration characteristics of the determined future risk as well as the level of attention the driver already pays to the risk.

In this first step of the communication which is the notification of the driver, some information on the determined future risk is given to the driver. If the driver then needs additional information that goes beyond the information provided in the first part of the communication, he will request for additional information. On the basis of such request which can be input by the driver through an input means like a microphone additional information output is performed. It is to be noted that such a request on the one side might be a spoken question by the driver input through a microphone and evaluated by the communication control means 10. But a reaction of the driver can also be a puzzled gaze or other facial expression that is analyzed from the driver sensing. This could be the case for example if the driver did not understand the reason for the message and thus his facial expression is puzzled. The driver's reaction to the notification is thus analyzed and on the basis of a determined need for further information additional information is provided. If it is thus concluded that the driver did not understand the reason for the notification, all further information that is needed for him to understand the situation correctly is provided which means a more or less full explanation of the situation will be given. Again, this could be performed by a speech output. On the other side, if the reaction of the driver is asking a specific question to the system, the input speech will be analyzed by the communication control means 10 and the additional information is limited to an answer to the driver's question of course other input modalities besides speech may also be used.

This two step communication with the driver that takes into account not only the type, likelihood and urgency of the upcoming risk, but also the driver's attention to this risk by combining this information in the situation assessment unit 9 results in an improved system acceptance of the driver. When the system detects a non-critical, but insufficient situation and risk awareness of the driver, it guides the attention of the driver to the risk for example by a visual display. This could be a light in the direction of the upcoming risk. The user will then have the possibility to request more information from the system if he desires. On the other side for more critical issues, meaning more urgent risks or risk with a more severe impact, the first information captured by the notification can be more obtrusive and informative. For example, a beep accompanied by a visual display informing on the type of threat or risk could be output.

It is to be noted that violation of traffic rules in the past, present or future are also considered as risks, because such violations can directly lead to a safety critical situation.

As the notification of the driver is already adapted to the driver's risk awareness, the annoyance of the driver can be reduced significantly. Furthermore, only relevant information is presented to him.

Figure 2:
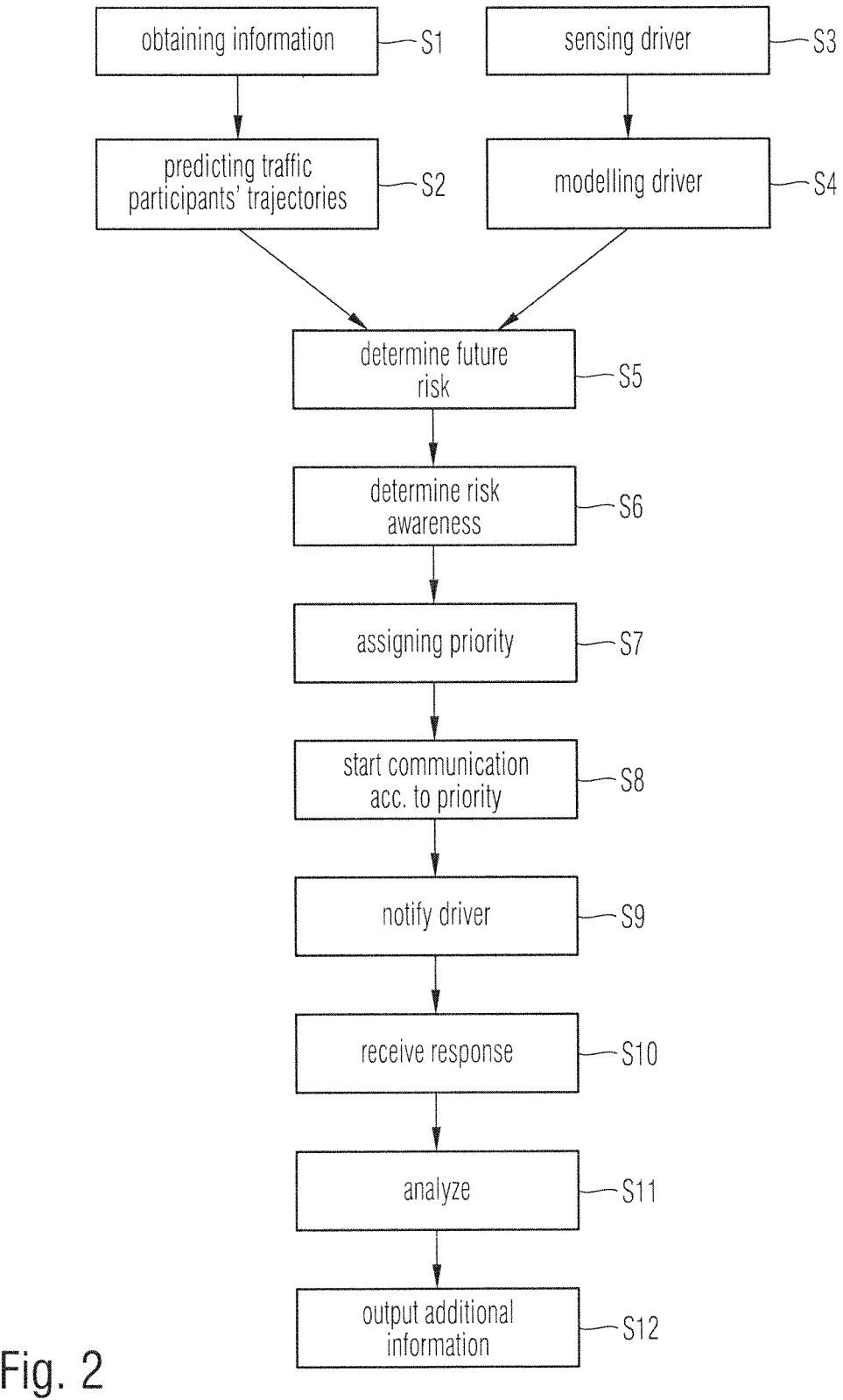
FIG. 2 shows a flowchart explaining the major steps of the present invention.

In the following a summary of the method will be given with respect to the flowchart as depicted in FIG. 2. In a first step S1, information on a traffic scene is obtained. This includes read-in of an initial map as well as obtaining the outputs of sensing means. In a next step, the trajectories of other traffic participants are predicted (S2) on the basis of an established environment representation.

Simultaneously, the driver is sensed by a sensing means in step S3 and on the basis of the result of the output of the sensing means, the driver's state is modelled (S4). The predicted trajectories including the ego-vehicle's trajectory and the output of the driver's modelling is then analysed and future risks are determined in step S5. Furthermore, in the next step the driver's risk awareness is determined, which is later on the basis for choosing a modality for the communication with the driver in the two-steps. In step 9 a priority is assigned to the individual risks. This priority takes account of the timeline, which means that the priority of a risk that is already present or will be coming up in the near future, is a higher priority than for a risk that lies further in the future. On the other side, the likelihood and the possible impact may also be taken into consideration to increase or reduce the priority.

If a combination of a measure for the determined future risk and the determined risk awareness for this particular determined future risk fulfils a predetermined condition, communication with the driver is started in step S8. When the communication is started, the priority that is assigned to the determined future risk in step S7 is taken into consideration. This means that the communication is started only in case that no future risk to which a higher priority is assigned is present. In such a case, at first the future risk with a higher priority would be handled. If the urgency and/or the likelihood and/or impact of a future risk is taken into consideration when the priority is assigned, this automatically leads to the fact that if the driver currently is focused on aspects of the traffic scene related to another determined future risk, he will not be disturbed by a notification, because at that point in time the communication for a future risk with a lower priority will not be started. In case that the likelihood and level of impact of a future risk is used for determining the priority in combination with the time sequence of the determined future risks this also can lead to the fact that even if the risk is further ahead in the future the communication might be started immediately because of the severity of the future risk which is higher than the currently attended future risk by the driver.

When the communication is started at first in step S9 the driver is notified by the system using an appropriate way output of some information on the future risk. After that a reaction of the driver is analysed in step 11. Such reaction might be a question asked by the driver or an analysis of his actions or facial expression. Then finally in step S12 additional information might be output in case that the analysis reveals that the driver needs additional information. As mentioned above, this could be a puzzled face which means that a lot of additional information is necessary, because the driver did not understand the notification at all, or the driver requests for a particular information which is then given by the system. Again, the modality for giving the additional information might be adapted to what is needed by the driver and what is analysed from the driver's reaction.

In the following to improve the understanding of the present invention a plurality of examples illustrating the function of the invention will be given.

A car driver is driving in the city through a section with uncontrolled intersections. The system detects that the driver did not properly check for traffic from the right (assuming the priority from right rule applies) and does not slow down sufficiently to be able to stop at the intersection if a car is approaching from the right. In the presently described situation in fact no car is approaching from the right but of course if the driver does generally not recognize that he has to yield priority this could possibly cause a risk in another situation. Thus, to improve the driver's long term situation awareness the system will guide the driver's attention to the right side. This could be made by visually guiding the driver's attention using lights to the right side of the intersection.

On request from the driver who might for example ask ("What does this alarm mean?") or after inferring from his facial expression that he is puzzled, the system informed the driver on his problematic behavior. This could be made even in case that no immediate risk can be determined. Via speech output, the system might give him general information like for example: "Be careful! Traffic from the right will have priority". If the system on the other side already recognized that a car is in fact approaching from the side, the obtrusiveness of the notification might be increased by an alarm tone or the like. Thus, depending on the severity of the situation, the modality of the communication might be changed. In such a case of higher urgency, the system might say before the driver enters the intersection: "Be careful! This car will have priority". This is in particular a suitable notification in case that the system recognized that the driver did already see the car, but from the insufficient slowing down, it could be derived that the driver is not aware that the approaching car has priority. Furthermore, the system detects that the driver cuts off another car's right of way, the system could make the information more specific by saying after passing the intersection: "Be careful! This car had priority". The timing of this information will be adapted such that it does not distract the driver from its current driving task. Thus, it is not only possible to increase the driver's attention for a current situation, but also for future situations. The system in that case might for example delay the output of the notification and the entire communication with the driver in order not to distract his attention what might lead even to an increased risk. But in order to improve the situation awareness and attention of the driver, in general after such situation has past, the driver may be informed about his risky behavior.

According to another example, a car driver is driving in the city towards an intersection where also trams cross. A tram having the right of way is approaching and the system detects that the driver is not decelerating properly to let the tram pass. The system will then inform the driver on his problematic behavior, whereby the driver's short and long term situation awareness is improved. After a further request from the driver or depending on the threat's characteristics, it directly will say: "Be careful! The tram has priority". Such speech output may be chosen for example if it is recognized by the system that if no immediate reaction of the driver is made a collision is not avoidable. In case that there is still enough time to react the first notification might be less obtrusive and only if the driver then asks the full information will be given.

According to another example, a driver is driving in the city towards an intersection where he wants to turn left. A motorcycle is approaching on the opposing lane and the system detects that the driver is not decelerating properly to let the motorcycle pass before he turns. To improve the driver's short and long term situation awareness, the system will inform the driver on his problematic behavior. It will guide the attention of the driver to the motorcycle after request by the driver it might say: "Be careful! The motorcycle is approaching faster than it seems".

A car driver is driving in a one-way street where cyclists are also allowed to enter from the opposing side. A cyclist is approaching from the front. The system detects that the gap between the cars parked on the left and the ego vehicle is too narrow to allow a safe passage of the cyclist. The system will guide the attention of the driver to the cyclist and will either directly or after request inform the driver on a possible critical situation. It might say "Be careful! You are not leaving enough space for the cyclist to pass". The system might react in a similar way before overtaking a cyclist on the right.

A car driver is driving in a one-way street where cyclists are also allowed to enter from the opposing side. A cyclist is approaching from the front. The system detects that the gap between the cars parked on the left and the ego vehicle is too narrow to allow a safe passage of the cyclist. The system will initiate a steering movement intended to leave more space to the cyclist. This movement will either be only a partial movement and serve to capture the attention of the driver or a full movement allowing for sufficient space to the cyclist. On request from the driver the system might say "Be careful! You are not leaving enough space for the cyclist to pass". The system might react in a similar way before overtaking a cyclist on the right.

In the morning in winter a cyclist is driving on a bicycle lane in the city towards a roundabout he wants to traverse. When approaching the roundabout the system detects that there was a strong increase in near accidents at this roundabout this morning and it warns him. It might say "Be careful! The car drivers are blinded by the sun at this roundabout".

A tram driver is driving in the city and approaching a driveway. The system detects that a car is approaching from the driveway towards the road. Additionally the system observed that there is currently not a more important threat requiring the attention of the (tram) driver and the driver was not paying attention to the approaching car. Then the system will guide the attention of the driver on the possible threat (e.g. visually). Additionally, the system will highlight the car on the HUD (head up display). On request by the driver the system might respond via speech "Be careful! The car on the left might enter your track"

The driver is driving in the city and cars are parked on the side. The car detects that a child is approaching a parked car in the direction of the road and disappears behind the parked car. Additionally the system observed that there is currently not a more important threat requiring the attention of the driver and the driver was not paying attention to the child. Then the system will inform the driver on the possible threat using a combination of a HUD and a speech dialog. The system will highlight the parked car on the HUD and output via speech "Be careful! There is a child behind this car and it might try to cross the street"

The invention claimed is:

1. A method for improving a traffic participant's attention, said method comprising:
   obtaining via a traffic participant's sensor information on a traffic scene encountered by the traffic participant;
   predicting a traffic situation development based on the obtained information;
   determining a measure for at least one future risk in the predicted traffic situation development; and
   starting a communication with the traffic participant, wherein the communication comprises:
   notifying the traffic participant by providing information on the determined future risk;
   receiving, via another sensor, a reaction of the traffic participant to the notification;
   determining whether the traffic participant's reaction includes a request for additional information; and
   providing said additional information when the traffic participant wishes to receive the additional information.

2. The method according to claim 1, wherein the traffic participant's risk awareness is determined and the communication is started only if a predetermined condition is fulfilled by a combination of the risk awareness and the measure of the future risk.

3. The method according to claim 2, wherein the traffic participant is sensed by the at least one traffic participant's sensor, and based on a traffic participant's model and on sensor data an estimation for a state of the traffic participant's is made from which the risk awareness is inferred.

4. The method according to claim 1, wherein a plurality of future risks in the predicted traffic situation development is determined and for each of the plurality of future risks a dedicated traffic participant's situation awareness is determined.

5. The method according to claim 4, wherein the plurality of future risks are ranked with respect to a priority value associated with the respective future risk.

6. The method according to claim 5, wherein the priority value is set based on temporal occurrence of the associated future risk.

7. The method according to claim 5, wherein the priority value is set based on severity of the associated future risk.

8. The method according to claim 5, wherein the communication with respect to the future risk is started only if a predetermined condition is fulfilled and there is no other future risk having a higher priority value.

9. The method according to claim 1, wherein a timing of a beginning of the communication is set in accordance with a characteristic of the determined future risk.

10. The method according to claim 1, wherein a modality of the communication is a combination of at least two of acoustic, visual, haptic, and speech input or output.

11. The method according to claim 1, wherein the communication information being provided to the traffic participant includes at least one of location, trajectory, identity, urgency, likelihood, and level of the future risk.

12. The method according to claim 1, wherein violation of a traffic law is determined as the future risk.

13. A system for improving a traffic participant's attention, the system comprising:
prediction means for predicting a traffic situation development;
future risk determining means for determining a measure for at least one future risk in the predicted traffic development; and
communication control means for controlling a notification to the traffic participant by:
notifying the traffic participant by providing information on the determined future risk;
receiving a reaction of the traffic participant to the notification,
determining whether the traffic participant's reaction includes a request for additional information; and
providing said additional information when the traffic participant wishes to receive the additional information.

14. The system according to claim 13, further comprising:
sensing means for sensing the traffic participant.

15. The system according to claim 13, further comprising:
communication means for communication between the system and the traffic participant.

16. The system according to claim 15, wherein the communication means comprises at least one of a speaker, a microphone, a display, a head-up display, vibration elements, a lamp, or a lamp array.

* * * * *